United States Patent
Steinberg

(10) Patent No.: US 10,488,067 B2
(45) Date of Patent: Nov. 26, 2019

(54) UTILITY ALLOCATION AND CONTROL SYSTEM AND METHOD

(71) Applicant: Tal Steinberg, Fort Lee, NJ (US)

(72) Inventor: Tal Steinberg, Fort Lee, NJ (US)

(*) Notice: Subject to any disclaimer, the term of this patent is extended or adjusted under 35 U.S.C. 154(b) by 391 days.

(21) Appl. No.: 15/499,180

(22) Filed: Apr. 27, 2017

(65) Prior Publication Data
US 2017/0314798 A1    Nov. 2, 2017

Related U.S. Application Data

(60) Provisional application No. 62/328,258, filed on Apr. 27, 2016.

(51) Int. Cl.
| | | |
|---|---|---|
| *G06F 11/30* | (2006.01) | |
| *F24F 11/62* | (2018.01) | |
| *F24F 11/30* | (2018.01) | |
| *F24F 11/63* | (2018.01) | |
| *F24F 11/52* | (2018.01) | |
| *F24F 120/20* | (2018.01) | |
| *F24F 110/10* | (2018.01) | |
| *F24F 11/46* | (2018.01) | |

(52) U.S. Cl.
CPC ............ *F24F 11/62* (2018.01); *F24F 11/30* (2018.01); *F24F 11/46* (2018.01); *F24F 11/52* (2018.01); *F24F 11/63* (2018.01); *F24F 2110/10* (2018.01); *F24F 2120/20* (2018.01); *G05B 2219/2614* (2013.01)

(58) Field of Classification Search
CPC ........................................................ F24F 11/62
See application file for complete search history.

(56) References Cited

U.S. PATENT DOCUMENTS

| | | | |
|---|---|---|---|
| 9,256,908 B2 | 2/2016 | Dai | |
| 2004/0024483 A1* | 2/2004 | Holcombe | G06Q 30/02 700/122 |

* cited by examiner

*Primary Examiner* — Phuong Huynh
(74) *Attorney, Agent, or Firm* — John H. Choi & Associates

(57) ABSTRACT

A utility individual usage allocation and control system and method to manage utility and related services to a plurality of units in a facility to increase operational efficiency and cost savings. The system and method include a plurality of controllers positioned in a plurality of respective zones. A plurality of output devices are operably coupled to each controller and a utility provider is operably coupled to each of the output devices. A processor is configured to receive run-time data from each of the plurality of controllers, the run-time data corresponding with actual time the output device is in an engaged state. Run-time data from each controller is processed to determine proportion of total utility used by each zone. The processor is remote from the controllers and data is transmitted by wireless signals. The utility is selected from a group comprising hot air, hot water, cool air, electricity and memory data.

20 Claims, 3 Drawing Sheets

| Unit | Current Temp | | Set Temp | | Thermostat Mode | Usage in March 2016 (Minutes) | Total allocated bill |
|---|---|---|---|---|---|---|---|
| 1A | 68 | - | 70 | + | Heat | 2100 | $90.13 |
| 1B | 75 | - | 75 | + | Heat | 2500 | $107.30 |
| 1C | 72 | - | 71 | + | Heat | 2200 | $94.42 |
| 1D | 70 | - | 68 | + | Heat | 1800 | $77.25 |
| 2A | 70 | - | 70 | + | Heat | 1900 | $81.55 |
| 2B | 42 | - | Off | + | Off | 150 | $6.44 |
| 2C | 78 | - | 80 | + | Heat | 3000 | $128.76 |
| 2D | 68 | - | 70 | + | Heat | 2500 | $107.30 |
| 3A | 68 | - | 68 | + | Heat | 1950 | $83.69 |
| 3B | 70 | - | 70 | + | Heat | 2000 | $85.84 |
| 3C | 72 | - | 70 | + | Heat | 2350 | $100.86 |
| 3D | 66 | - | 65 | + | Heat | 850 | $36.48 |
| Summary | | | | | | 23300 | $1,000 |

FIG. 3

UTILITY ALLOCATION AND CONTROL SYSTEM AND METHOD

CROSS-REFERENCE TO RELATED APPLICATION

This application claims priority to U.S. Provisional Application No. 62/328,258, filed on Apr. 27, 2016, which is incorporated by reference in its entirety.

FIELD OF THE INVENTION

The present invention relates to allocation and control of utilities, and in particular to a new utility allocation system and method for controlling and allocating utility in a facility.

BACKGROUND

Heating, ventilation and air conditioning (HVAC) are essential in maintaining a healthy and habitable living or working environment. Utilities such as gas and electricity are necessary to operate HVAC systems. For many buildings with multiple units utilities are usually paid by the owner and the tenants have no ability to control and pay for their own usage. Moreover, each tenant might have differing preferences of a comfortable room temperature or may have different needs and habits in the use of utilities. For example, a particular tenant may be away from home for an extended period of time and would prefer to turn off the heating and air conditioning while away.

One common method of allocating and monitoring utilities in multi-unit buildings is by installing individual sub-meters that measure run-time in zone valves. This way, each unit is billed based on its sub-meter reading. This method, however, is costly because of equipment, installation and maintenance costs. This method is also problematic because the meters are capable of being tampered with. Also, this method does not give building owners the option of controlling the temperature and only provides usage readings.

Another common method of allocating and monitoring utilities, in particular heating, in multi-unit buildings is to install separate heating units (e.g., furnace or boiler) in each unit and separate meters for the same. Again, this method is very costly in terms of equipment, installation and maintenance.

Yet another common method of allocating and monitoring utilities in multi-unit buildings is by metering the overall consumption of the building and allocating costs based on square footage of each particular unit. With this method, however, tenants with lower usage could be required to pay more than the utilities actually used and tenants with higher usage could pay less than actual usage. Also, in many cases, because payment is allocated, tenants are not as mindful of the usage of utilities which results in much waste. For example, tenants might have the air conditioner or heat on even when the unit is unoccupied.

In certain instances, especially in older buildings, heat is provided by circulating hot water or steam to radiators or baseboards within each unit throughout the building. Each tenant cannot control the temperature of the unit and therefore a particular unit may be too cold because of lack of heat especially if the unit is far away from the central boiler, or too hot because excessive heat is provided in which case the tenant might open windows to cool the unit. In turn, much heat is wasted.

As seen above, current methods and systems for providing HVAC and allocating utilities to multiple units in apartment buildings and the like are problematic.

OBJECTS AND SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

The present invention provides a new method to measure and allocate individual heat and/or cool usage in apartment buildings and commercial buildings. In addition, the system can also be used as a control system and method of managing utility and related services to a plurality of units in a facility. For example, heating to a plurality of housing units in an apartment building are controlled and allocated by gathering run-time data from a plurality of thermostats in each of the housing units, and controlling the heat to each of the individual housing units for increased operational efficiency and cost savings.

The present invention solves the problems associated with the traditional allocation and monitoring of utilities described above. With the present invention, equipment and installation costs are much less compared with traditional sub-metering because there are less components as well as less labor necessary for installation as well. Also, each tenant is billed fairly as the tenant is only billed for its allocated use of utilities.

Building owners also benefit because utilities could be fully controlled. For example, thermostats could be blocked from tampering and the system could also be monitored for unusual activity. In addition, the system could be programmed to reduce or terminate utilities for any reason, e.g., external high temperatures, fire, non-payment of utility bills, etc. The system could also be fully integrated with billing and property management software which could be web-based so that the building manager could have access from any location.

The present invention provides a method for allocating usage and costs for utility comprising: providing utility to a plurality of zones based on pre-determined parameter set on a controller within each zone; transmitting utility run-time data within each zone from each respective controller to a processor; and processing the run-time data to determine proportion of total utility used by each zone. Each controller is operably coupled to an output device and each output device is operably coupled to a utility provider such that utility is provided to the respective zone until the pre-determined parameter is met. Run-time is determined by actual time the controller is in an engaged state while the pre-determined parameter is met. Alternatively, run-time is determined by actual time the output device is in an engaged state. In one aspect, the processor is remote from each controller. In another aspect, run-time data is transmitted by wireless signal. The utility is could be hot air, hot water, cool air, electricity and memory data.

The present invention also provides a system for allocating costs for utility comprising: a plurality of controllers positioned in a plurality of respective zones; a plurality of output devices, each output device operably coupled to each controller; a utility provider operably coupled to each of the plurality of output devices; and a processor configured to receive data from each of the plurality of controllers. In one aspect, the processor is remote from the controllers. In another aspect, data is transmitted by wireless signals. In one embodiment, the data is run-time data corresponding with actual time the output device is in an engaged state. The run-time data from each controller is processed to determine proportion of total utility used by each zone. The utility could be hot air, hot water, cool air, electricity and memory data. In another aspect, the processor is further configured to transmit a signal to the plurality of controllers and a signal is transmitted to any one of the controllers such that the controller is set to a pre-determined parameter.

BRIEF DESCRIPTION OF THE DRAWINGS

The foregoing summary, as well as the following detailed description of presently preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 3 is an example heating billing summary.

Figure 1:
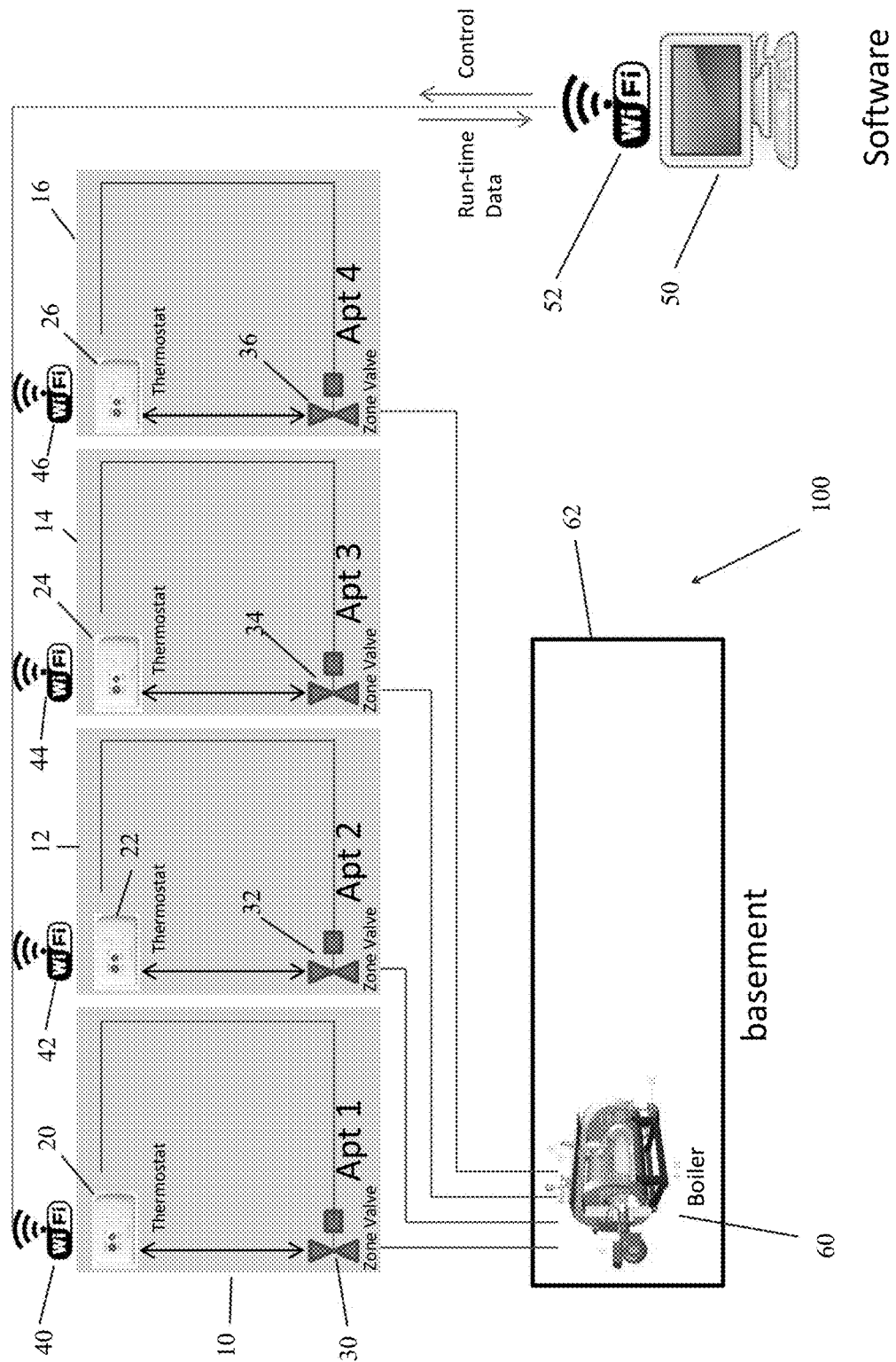
FIG. 1 is a schematic view of the utility allocation system of the present invention.

To facilitate an understanding of the invention, identical reference numerals have been used, when appropriate, to designate the same or similar elements that are common to the figures. Further, unless stated otherwise, the features shown in the figures are not drawn to scale, but are shown for illustrative purposes only.

DETAILED DESCRIPTION OF THE PREFERRED EMBODIMENTS

Certain terminology is used in the following description for convenience only and is not limiting. The article "a" is intended to include one or more items, and where only one item is intended the term "one" or similar language is used. Additionally, to assist in the description of the present invention, words such as top, bottom, upper, lower, front, rear, inner, outer, right and left are used to describe the accompanying figures. The terminology includes the words above specifically mentioned, derivatives thereof, and words of similar import.

As mentioned above, the present invention is directed to a web-based utility allocation and control system and method to manage utility and related services to a plurality of units in a facility. For example, heating or cooling to a plurality of housing units in an apartment building are controlled and allocated by gathering run-time data from a plurality of thermostats in each of the housing units, and controlling the heat to each of the individual housing units for increased operational efficiency and cost savings.

As shown in an exemplary embodiment in FIG. 1, the web-based utility allocation and control system 100 involves, for example, allocation and control of the delivery of heat to a plurality of apartments 10-16 or other housing units or portions of a facility, such as a housing complex.

Each apartment 10-16 has at least one controller or thermostat 20-26, respectively which controls the heating of at least one zone. The respective thermostats 20-26 send control signals to zone valves 30-36 for each zone of the apartments 10-16. Each thermostat 20-26 also has a communication interface 40-46, respectively, which may provide a wireless and/or wired communications channel through, for example, a WIFI-based transceiver, to send run-time data to a web-based software 50 having a compatible communication interface 52, such as a WIFI-Radio or Z-wave based transceiver. In turn, each thermostat 20-26 receives control signals from the web-based software 50 via the communication interfaces 40-46 and 52, respectively, for individually and independently controlling each respective output device or zone valve 30-36 from and to a disengaged or closed state and an engaged or opened state.

Specifically, in response to the control signals from the web-based software 50, each thermostat 20-26 sends respective control signals to its corresponding zone valve 30-36, which interacts with a utility provider 60, such as a boiler in the facility, such as being located in a basement 62 of the facility.

In alternative embodiments, the utility provider 60 may be an electrical, natural gas, water, heating oil, air conditioning, or other services, such as media streaming services and other metered or managed utilities and services to each apartment and/or zones or sub-zones of the apartments. In further alternative embodiments, the zones may include individual housing units in a neighborhood, locations in an office building, or sections of mobile facilities such as aircraft, submarines, and ships such as luxury ocean liners.

As described herein, the web-based software 50 operates using known hardware for receiving and processing the real-time data, such as current thermostat settings and current temperatures measured by the thermostats 20-26, and for generating the respective control signals to which each thermostat 20-26 is responsive. The software 50 may be implemented in any known format such as C++ or JAVASCRIPT, executed on any known operating system such as MICROSOFT WINDOWS. The software 50 may communicate over an existing network to each of the thermostats 20-26, such as communicating over the Internet using web-based or Internet-compatible protocols, such as HTTP and/or TCP, and may also include web-based browsers such as MICROSOFT EXPLORER operating the C++ or JAVASCRIPT-based computer software. In further alternative embodiments, the web-based software 50 communicates with the thermostats 20-26 over an Intranet or other known types of networks, such as local area networks (LANs) or wide area networks (WANs).

Alternatively, the web-based software 50 could be a software installed on a hard drive of a computer and run on the computer's memory which may be located in proximity to the facility having the apartments 10-16 therein, and so the transmissions between the computer and the thermostats 20-26 may be within operational ranges of the communications protocols, such as WIFI or other near field communications (NFC) such as BLUETOOTH. The computer may also be located remote from the facility and its apartments 10-16, and may communicate with the thermostats 20-26 with known wireless and/or wired interfaces and protocols. The computer may further include appropriate hardware for executing the computer software and for performing the operations described herein, such as memory and other storage devices implementing a database of data concerning each individual zone and historical data regarding delivery, allocation, and control of the utility, such as heat, and other services to each of the zones.

Figure 2:
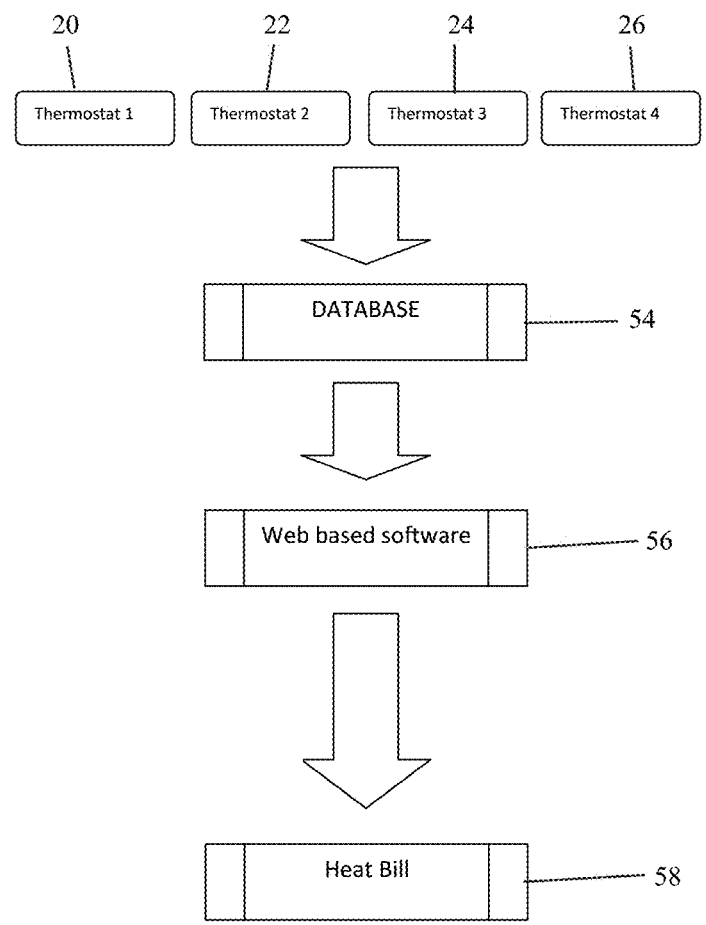
FIG. 2 is a flowchart of operation of the utility allocation system of FIG. 1.

Referring to FIG. 2, the system 100 operates to deliver, allocate, and control the utility and other services for increased operational efficiency and cost savings. In the example embodiment of delivery of heat, as shown in FIG. 2, residents control the temperature inside their zones or units 10-16 using the WIFI-enabled thermostats 20-26, respectively, which may be the commercially-available ECOBEE SMART SI model thermostat. When a resident desires a different pre-determined parameter or temperature, such as a higher temperature in a zone, the resident changes the target temperature via the corresponding thermostat. For example, the resident increases the target temperature on the thermostat which triggers the heat mode to turn on, which opens the corresponding zone valve allowing, for example, hot water to flow through the heating pipes from the boiler 60 to the zones, and therefore heats the apartment and/or zones or sub-zones until the desired temperature is reached. Alternatively, if the heating system is forced air, a furnace is activated and warm air is circulated to and from each unit.

With the web-based software 50 running in the background and using the application programming interface (API) of the ECOBEE SMART SI thermostat, the web-based software 50 receives the run-time data, for example, by accessing and measuring the time at which each thermostat in the facility, such as the apartment building, is in the engaged state, or ON position or state, for run-time operations of providing the heat or hot water to the individual apartment corresponding to the thermostat. Run-time data such as the date and time are also gathered, for example, in the form of timestamps or other indicia. The software 50 records all data such as the date, time, thermostat identifier, and thermostat settings in the database 54.

The web-based software 50 pulls both the thermostat data, such as thermostat identifiers and settings, as well as the run-time information such as the dates and times from the database, and is capable of generating reports, such as queries and results from a MICROSOFT SQL database, as well as reports from MICROSOFT EXCEL or MICROSOFT ACCESS. For example, a report of all of such pulled information from the database may be presented under one page, such as listing each thermostat with its own total monthly run-time usage displayed in hours of usage, for example, a sample billing summary with allocations is shown in FIG. 3.

The web-based software 50 also includes predetermined algorithms for allocating each individual apartment usage based on the numbers of hours in which the thermostat was in an ON position in a single month as compared to the overall time in which heat was consumed by the entire facility, such as the entire apartment building. Using this data of the heat usage of individual apartments, the software assigns a percentage to each unit or zone, which is then used to calculate the actual cost of heat used by each unit for which the apartment resident is responsible from the total monthly heating bill. Therefore, using the system 100 and method of the present invention, the residents of each apartment or unit in the facility receive accurate heating bills based on their true consumption, in which the amount due depends on actual usage, instead of estimated usage based on the area, volume, or square footage of their apartment, or instead of estimated usage based on a run-time sub-metering system as in the prior art.

In another alternative embodiment, the system 100 can also block residents from raising the heat in their apartment or otherwise tampering with their thermostats, for example, if a resident fails to pay for heat or rent in a past bill, yet the system 100, through the web-based software, may maintain the temperature in their apartments at another pre-determined parameter or the minimum temperature required by law, such as for example 68 degrees Fahrenheit, which therefore saves energy and money.

Other advantages of the present invention include using fewer components in the system 100 than in prior art systems which rely on sub-metering systems and billing allocation methods, and so the present invention will cost less to implement and maintain than the prior art sub-metering systems. Furthermore, by using the web-based software 50 gathering the real-time data, the system 100 of the present invention can be fully integrated with billing and property management software known in the art. For example, by being web-based or network-based, the software 50 can be accessed from anywhere such as globally through the Internet or other global communications methods.

In addition, using the gathered real-time data from the thermostats 20-26, the web-based software 50 can automatically control heat to be set to turn on or off based on a preset time schedule, as well as to automatically shut off heat in a housing complex or facility in case of high temperatures, such as high external temperatures or in cases of fire.

The present invention may be embodied in other specific forms without departing from its spirit or essential characteristics. The described embodiments are to be considered in all respects only as illustrative and not restrictive. The scope of the invention will be, therefore, indicated by claims rather than by the foregoing description. All changes which come within the meaning and range of equivalency of the claims are to be embraced within their scope.

What is claimed is:

1. A method for allocating individual usage and/or costs for utility comprising:
   providing the utility to a plurality of zones based on a pre-determined parameter set on a controller within each zone, wherein each controller is operably coupled to a respective output device and the utility is provided to the respective zone by the output device until the pre-determined parameter is met, wherein each output device is operably coupled to a utility provider;
   transmitting utility run-time data within each zone from each respective controller to a processor;
   processing the utility run-time data to determine a proportion of a total utility used by each zone, thereby allocating individual usage and/or costs for the provided utility using the proportion; and
   blocking a user from modifying a first controller associated with the user.

2. The method of claim 1, wherein the utility run-time data is determined by an actual time during which the controller is in an engaged state while the pre-determined parameter is met.

3. The method of claim 1, wherein the utility run-time data is transmitted by a wireless signal.

4. The method of claim 1, wherein the utility is selected from a group consisting of hot air, hot water, cool air, electricity and memory data.

5. The method of claim 1, wherein each controller is a thermostat.

6. A method for allocating individual usage and/or costs for utility comprising:
   providing the utility to a plurality of zones based on a pre-determined parameter set on a controller within each zone;
   transmitting utility run-time data within each zone from each respective controller to a processor;

processing the utility run-time data to determine a proportion of a total utility used by each zone, thereby allocating individual usage and/or costs for the provided utility using the proportion; and blocking a user from modifying a first controller associated with the user.

7. The method of claim 6, wherein each controller is operably coupled to an output device, each output device is operably coupled to a utility provider and the utility is provided to the respective zone until the pre-determined parameter is met.

8. The method of claim 6, wherein the utility run-time data is determined by an actual time during which the controller is in an engaged state while the pre-determined parameter is met.

9. The method of claim 6, wherein the utility run-time data is determined by an actual time during which the output device is in an engaged state.

10. The method of claim 6, wherein the utility run-time data is transmitted by a wireless signal.

11. The method of claim 6, wherein the utility is selected from a group consisting of hot air, hot water, cool air, electricity and memory data.

12. The method of claim 6, wherein the processor is remote from each controller.

13. A system for allocating individual usage and/or costs for utility comprising:
a plurality of controllers positioned in a plurality of respective zones;
a plurality of output devices, each output device operably coupled to a respective controller;
a utility provider operably coupled to each of the plurality of output devices for providing the utility; and
a processor configured to receive utility run-time data from each of the plurality of controllers to determine a proportion of a total utility used by each zone, thereby allocating individual usage and/or costs for the provided utility using the proportion, and to block a user from modifying a first controller associated with the user.

14. The system of claim 13, wherein the processor is remote from the controllers.

15. The system of claim 14, wherein the utility run-time data is transmitted by wireless signals.

16. The system of claim 13, wherein the utility run-time data corresponds with an actual time during which the output device is in an engaged state.

17. The system of claim 13, wherein the utility run-time data from each controller is processed to determine the proportion of a total utility used by each zone.

18. The system of claim 13, wherein the utility is selected from a group consisting of hot air, hot water, cool air, electricity and memory data.

19. The system of claim 13, wherein the processor is further configured to transmit a signal to the plurality of controllers.

20. The system of claim 19, wherein the signal is transmitted to any one of the controllers to set at least one controller to a pre-determined parameter.

* * * * *